United States Patent Office 3,375,278
Patented Mar. 26, 1968

3,375,278
1,1-BIS(BIPHENYLYL)-2-METHYL-3-TERTIARY AMINOPROPANOLS AND SALTS THEREOF
Robert B. Moffett, Kalamazoo, Mich., assignor to The Upjohn Company, Kalamazoo, Mich., a corporation of Delaware
No Drawing. Filed June 6, 1966, Ser. No. 555,253
2 Claims. (Cl. 260—570)

This invention relates to new and useful chemical compounds and more particularly to 1,1-bis(biphenylyl)-2-methyl-3-tert.aminopropanols having the formula:

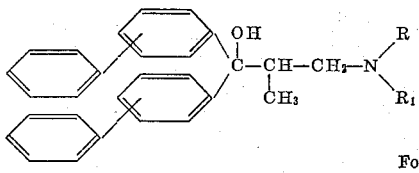

Formual - wherein R and $R_1$ taken separately are alkyl having from 1 to 4 carbon atoms, inclusive, and taken together with —N< constitute a saturated heterocyclic amino radical selected from the group consisting of pyrrolidino, piperidino, morpholino, and N-methyl-piperazino; and the acid addition salts thereof.

Examples of alkyl having from 1 to 4 carbon atoms are methyl, ethyl, propyl, and butyl, including isomeric forms thereof.

Compounds of the Formula I can be prepared by reacting a phenyl Grignard reagent having the formula:

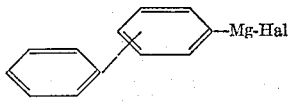

(wherein "Hal" is halogen, preferably bromine or iodine) and a lower alkyl 2-methyl-3-tert.aminopropionate compound of the formula:

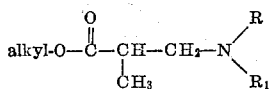

wherein R and $R_1$ are as defined above (preferably a methyl or ethyl ester), in an anhydrous solvent system, e.g., diethyl ether, diisopropyl ether, dibutyl ether, tetrahydrofuran and the like; decomposing the reaction mixture in a conventional manner such as by pouring the mixture into acidified ice water, e.g., hydrobromic or hydrochloric acid, preferably containing the same anion as the "Hal" in the Grignard reagent; and collecting the acid addition salt. The free base can be obtained by dispersing the acid addition salt in water and basifying the solution, e.g., with sodium hydroxide. The free base can be purified by conventional procedures such as by recrystallization from a suitable solvent, e.g., ethanol, acetone, methyl ethyl ketone, methylcyclohexane, and the like.

Acid addition salts of compounds of the Formula I can be prepared by neutralization of the free base with the appropriate amount of an inorganic or organic acid, examples of which are hydrochloric, hydrobromic, sulfuric, nitric, phosphoric, acetic, lactic, benzoic, salicylic, glycolic, succinic, tartaric, maleic, malic, pamoic, cyclohexanesulfamic, citric and methanesulfonic acids, and like acids. The neutralization can be carried out by a variety of procedures known to the art to be generally useful for the preparation of amine acid addition salts. The choice of the most suitable procedure will depend on a variety of factors including convenience of operation, economic considerations, and particularly the solubility characteristics of the particular free base, the acid, and the acid addition salt. If the acid is soluble in water, the free base can be dissolved in water containing an equivalent amount of the acid, and thereafter, the water can be removed by evaporation; in some instances the salt precipitates from the aqueous solution, particularly when cooled, and evaporation is not necessary. If the acid is soluble in a relatively non-polar solvent, for example, diethyl ether or diisopropyl ether, separate solutions of the acid and free base in such a solvent can be mixed in equivalent amounts, whereupon the acid addition salt will usually precipitate because of its relatively low solubility in the non-polar solvent. Alternatively, the free base can be mixed with an equivalent amount of the acid in the presence of a solvent of moderate polarity, for example, a lower alkanol, a lower alkanone, or a lower-alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. These acid addition salts are useful for upgrading the free bases.

The compounds of the Formula I have antibacterial activity, e.g., against *K. pneumoniae* and can be used to inhibit its growth. Illustratively, 1,1-bis(4-biphenylyl)-2-methyl-3-diethylaminopropanol hydrobromide has shown activity against *K. pneumoniae* in mice when given intraperitoneally at a dose of 200 mg./kg.

The compounds of the Formula I have the capacity to depress serum triglycerides. Illustratively, 1,1-bis(4-biphenylyl)-2-methyl - 3 - diethylaminopropanol hydrobromide depressed serum triglycerides 66% (over controls) at a dose of 100 mg./kg., orally in rats, as tested by a modification of the test described in "Drugs Affecting Lipid Metabolism" by S. Garattini and R. Paoletti, Elsevier Publishing Co., 1961, p. 151.

The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The compounds of the Formula I forms salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The compounds of this invention also form salts with penicillins. These salts have solubility characteristics which cause them to be useful in the isolation and purification of penicillins, particularly benzyl penicillin. Said salts can be formed either by neutralization of the free base form of acompound of Formula I, with the free acid form of a penicillin, or by a methathetical exchange of the anion of an acid addition salt of a Formula I compound, for example, the chloride ion of a hydrochloride, with the anionic form of a penicillin.

The following examples illustrate the best mode contemplated by the inventor for carrying out the invention but are not to be construed as limiting the scope thereof.

*Example 1.—1,1-bis(4-biphenylyl) - 2 - methyl-3-diethylaminopropanol hydrobromide*

4-biphenylylmagnesium bromide was prepared from 19.2 g. (0.8 mole) of magnesium and 186.4 g. (0.8 mole) of 4-bromobiphenyl, in the presence of 350 ml. of absolute ether and 200 ml. of tetrahydrofuran. To this was slowly added a solution of 34.6 g. (0.2 mole) of methyl 2-methyl-3-diethylaminopropionate in 50 ml. of absolute ether. After refluxing for 3 hours, and standing overnight, the mixture was poured into ice water containing 1 mole of hydrogen bromide. The resulting hydrobromide was a gum which soon crystallized. After cooling, it was collected, washed with cold water and ether, and dried, giving 109.7 g. of solid, M.P. 157–165° C. (dec.). This was recrystallized from 600 ml. of methanol (filtered hot), yielding 76.7 g. of 1,1-bis(4-biphenylyl)-2-methyl-3-diethylaminopropanol hydrobromide (71.5% theory) as white crystals, M.P. 222–223° C. (dec.).

*Analysis.*—Calc'd for $C_{32}H_{36}BrNO$: C, 72.44; H, 6.84; Br, 15.06; N, 2.64. Found: C, 72.26; H, 6.76; Br, 15.04; N, 2.84.

1,1-bis(4-biphenylyl) - 2 - methyl-3-diethylaminopropanol can be prepared by basifying the above hydrobromide with aqueous sodium hydroxide solution, extracting the mixture with ether, drying the extract, and evaporating the ether.

*Example II*

Following the procedure of the above Example I, substituting 2-bromobiphenyl and 3-bromobiphenyl for the 4-bromobiphenyl of the example, there can be obtained 1,1-bis(2-biphenylyl) - 2 - methyl - 3 - diethylaminopropanol hydrobromide and 1,1-bis(3-biphenylyl)-2-methyl-3-diethylaminopropanol hydrobromide, respectively.

*Example III*

Following the procedure of the above Example I, substituting methyl 2-methyl-3-dibutylaminopropionate,
methyl 2-methyl-3-diisobutylaminopropionate,
methyl 2-methyl-3-(methylpropylamino)propionate,
methyl 2-methyl-3-dipropylaminopropionate,
methyl 2-methyl-3-dimethylaminopropionate,
methyl 2-methyl-3-(ethylmethylamino)propionate,
methyl 2-methyl-3-pyrrolidinopropionate,
methyl 2-methyl-3-piperidinopropionate,
methyl 2-methyl-3-morpholinopropionate,
and methyl 2-methyl-3-(N-methylpiperazino)propionate, for the methyl 2-methyl-3-diethylaminopropionate, there can be obtained, as hydrobromdies:

1,1-bis(4-biphenylyl)-2-methyl-3-dibutylaminopropanol,
1,1-bis(4-biphenylyl)-2-methyl-3-diisobutylaminopropanol,
1,1-bis(4-biphenylyl)-2-methyl-3-(methylpropylamino)propanol,
1,1-bis(4-biphenylyl)-2-methyl-3-dipropylaminopropanol,
1,1-bis(4-biphenylyl)-2-methyl-3-dimethylaminopropanol,
1,1-bis(4-biphenylyl)-2-methyl-3-(ethylmethylamino)propanol,
1,1-bis(4-biphenylyl)-2-methyl-3-pyrrolidinopropanol,
1,1-bis(4-biphenylyl)-2-methyl-3-piperidinopropanol,
1,1-bis(4-biphenylyl)-2-methyl-3-morpholinopropanol,
and 1,1-bis(4-biphenylyl)-2-methyl-3-(N-methylpiperazino)propanol, respectively.

The free bases corresponding to the hydrobromides of Examples II and III can be prepared by treating the hydrobromides of Examples II and III in accordance with the procedure described in Example I.

What is claimed is:
1. A compound of the formula

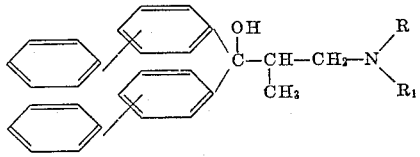

wherein R and $R_1$ are alkyl having from 1 to 4 carbon atoms, inclusive, and the acid addition salts thereof.

2. A compound of claim 1 wherein the compound is 1,1-bis(4-biphenylyl) - 2-methyl-3-diethylaminopropanol hydrobromide.

References Cited

Linder et al.: "Chemical Abstracts," vol. 53, pp. 1174–65 (1959).

CHARLES B. PARKER, *Primary Examiner.*

R. V. HINES, *Assistant Examiner.*